United States Patent
Lloyd

[11] Patent Number: 6,009,661
[45] Date of Patent: *Jan. 4, 2000

[54] SNAKE TRAPPING DEVICE

[76] Inventor: Graham R. Lloyd, Lot 3 Thoroughbred Pl., Terranora 2486, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,124

[22] Filed: Feb. 20, 1997

[51] Int. Cl.[7] .......................... A01M 23/02; A01M 23/16
[52] U.S. Cl. ...................................... 43/61; 43/58; 43/67
[58] Field of Search .................. 43/58, 60, 67, 43/61, 63

[56] References Cited

U.S. PATENT DOCUMENTS

| | | | |
|---|---|---|---|
| 117,005 | 7/1871 | Smith | 43/67 |
| 2,216,196 | 10/1940 | James | 43/67 |
| 2,566,176 | 8/1951 | Ellis | 43/61 |
| 2,573,228 | 10/1951 | Slauth | 43/61 |
| 2,725,661 | 12/1955 | Bowman | 43/61 |
| 3,426,470 | 2/1969 | Rudolph | 43/61 |
| 3,585,750 | 6/1971 | Routt | 43/61 |
| 4,158,929 | 6/1979 | Custard | 43/58 |
| 4,310,984 | 1/1982 | Brubaker | 43/61 |
| 4,413,439 | 11/1983 | Lindley . | |
| 4,449,316 | 5/1984 | Moorhead | 43/58 |
| 4,468,883 | 9/1984 | Williams | 43/67 |
| 4,569,149 | 2/1986 | Sensing | 43/58 |
| 4,763,439 | 8/1988 | Smith | 43/61 |
| 4,831,766 | 5/1989 | Giglietti | 43/60 |
| 5,345,710 | 9/1994 | Bitz | 43/61 |
| 5,497,576 | 3/1996 | Nowak | 43/58 |

FOREIGN PATENT DOCUMENTS

| | | | |
|---|---|---|---|
| 2667099 | 7/1962 | Australia . | |
| 000638234 | 2/1995 | European Pat. Off. | 43/61 |
| 2583617 | 12/1986 | France | 43/60 |
| 2601229 | 1/1988 | France | 43/60 |
| 8605657 | 10/1986 | WIPO . | |
| 8907887 | 9/1989 | WIPO . | |

*Primary Examiner*—Kurt Rowan
*Attorney, Agent, or Firm*—Omri M. Behr, Esq.

[57] ABSTRACT

A snake trap is disclosed in which a trigger activated door (4) closes in response to a horizontal force being applied to the trigger (7) which is pushed against by the snake as it moves within the trap.

1 Claim, 1 Drawing Sheet

SNAKE TRAPPING DEVICE

TECHNICAL FIELD

This invention relates to a snake trapping device.

BACKGROUND ART

Australian Patent 267099 discloses a trap which is essentially identical to the well known spring loaded mouse trap. This trap is intended to kill rather than capture the snake.

Also known are animal traps in which the weight of the animal depresses a cantilever mounted trigger. Such traps are exemplified by U.S. Pat. No. 4,413,439 and International Application PCT/GB86/00180.

A further type of trap is disclosed in International Application PCT/DK89/00040 In this trap, a door is dislodged by the animal as the animal enters the trap. The door then falls closed under the effect of gravity.

DISCLOSURE OF INVENTION

This invention in one aspect resides in a snake tapping device including:

a trigger activated door; and a trigger for activating closure of the door, wherein the trigger is moveable in a substantially horizontal direction and is activated by the snake applying a substantially horizontal force to the trigger, the substantially horizontal force being generated by the snake as it propels itself within the device.

BRIEF DESCRIPTION OF DRAWINGS

In order that this invention may be more easily understood and put into practical effect, reference will now be made to the accompanying drawing which illustrates a preferred embodiment of the invention, wherein.

BEST MODE

Figure 1:
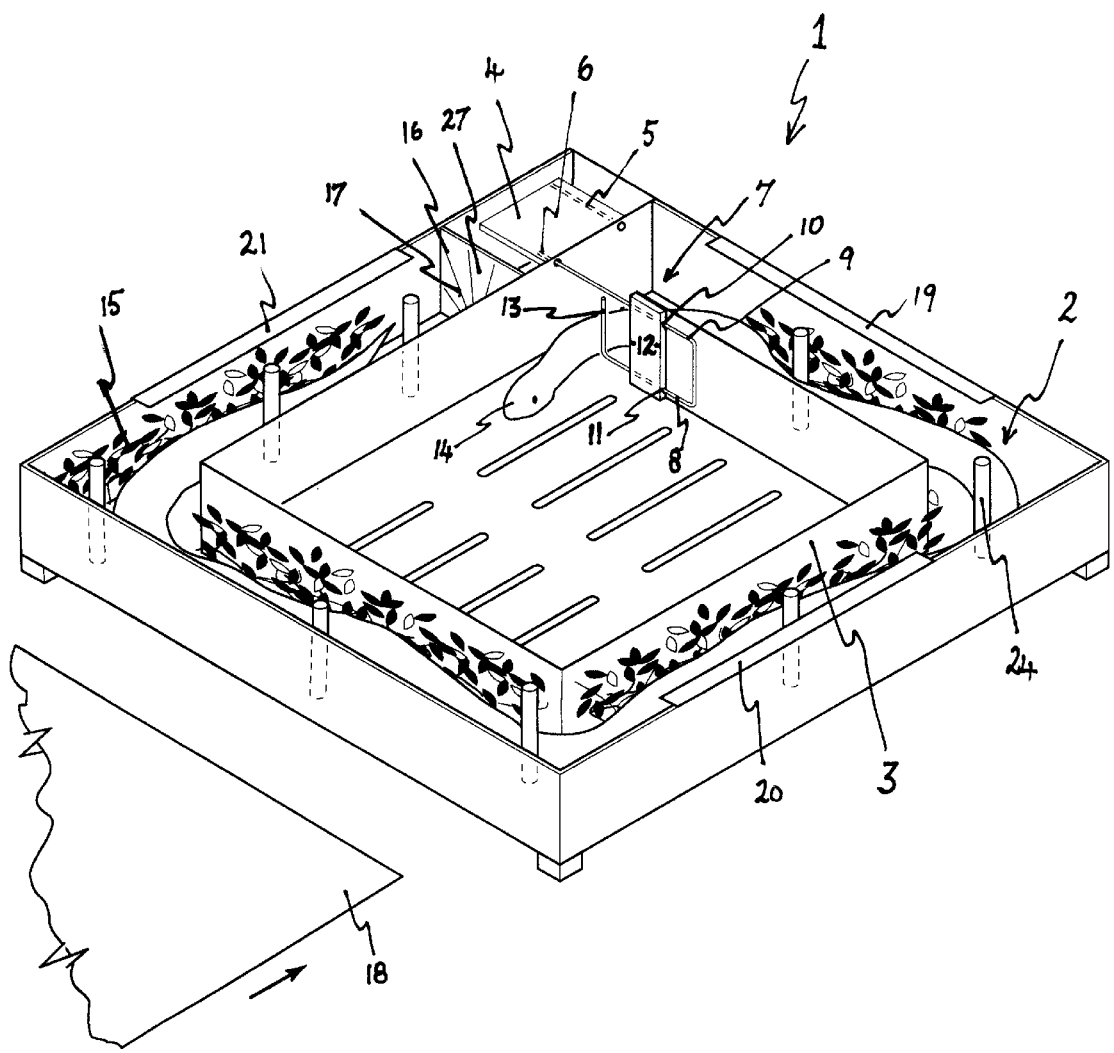
FIG. 1 is a perspective view of a trap according to the invention with the top cover removed.

In order to move forward a snake must apply force to objects or irregularities in its immediate surroundings.

It does this in essentially two ways; 1) it "grips" irregularities with the posterior or trailing edge of its ventral and/or ventro-lateral scales and pushes against these irregularities and, 2) it forms a partial loop of its body about larger irregularities and pushes against these larger irregularities.

Both of these methods can be employed concurrently and many irregularities may be used simultaneously in order to produce the apparently effortless and fluid-like movement displayed by snakes.

The present invention uses the snake's motive movements to trigger the trap. Specifically, it provides a trigger which the snake will push against to propel itself within the trap.

The present invention requires an attractant or bait to entice the snake into the trap.

In one form the device is a shallow, rectangular box with an opening in one wall immediately adjacent to one corner. This opening leads into an enclosed passageway which is formed by partitioning, of a similar height to the box's walls, which follows the inside of such walls in a parallel manner and terminates at some chosen point or, in a similar manner may then follow previous sections of partitioning so that the resulting passageway spirals towards the centre of the box.

A transparent, openable lid may be employed on the box to allow safe inspection of the device's interior and to facilitate removal of trapped snakes. For simplicity a lid which slides into position and is hold in place from above by inward facing lips on the top of three of the walls of the box may be preferable.

When positioned on the end of the fourth section of partitioning the trigger may act directly to cause a door to close. Such trigger may simply be comprised of a mounting block and a piece of tensile wire. The mounting block may be an elongate block of suitable material approximately the length of the height of the partitioning and with a hole near each end drilled transversely to the length of such block, and attached in an upright position on or near the end of the fourth section of partitioning so that such drilled holes are aligned roughly parallel to this partitioning.

The arms of a length of tensile wire bent in the shape of the letter "U" pass through the holes in the mounting block so that they project more or less horizontally across the gap between the end of the fourth and the inner face of the first section of partitioning. The upper arm of tensile wire passes through a hole in this first section of partitioning to become the seat or door release component of the trigger upon which the open door rests when the device is set. The lower arm of tensile wire is bent more or less vertically to provide an irregularity, the trigger contact component, which stands just beyond the end of the fourth section of partitioning when the device is set.

In this form of the device the door may be mounted pivotally across the top of the passageway at the entrance so that it opens internally, and closes, under the influence of gravity, against the floor of such passageway just prior to reaching a perpendicular orientation. Such a door may also be spring loaded so that it closes, once released, regardless of the manner in which it is mounted.

The force applied by a snake to the contact component of the trigger causes both wire arms to slide through the holes in the mounting block until the door release component of the trigger no longer provides a seat for the door, which swings closed against the floor of the passageway.

An insulation cover may be employed to protect the box and its contents from the effects of solar radiation, and to help exclude light.

Small legs may be employed to elevate the device and in combination with perforations in the floor of the box improved ventilation may be achieved.

Long strands of dried grass or some form of yarn or fibre providing similar qualities to such grass may be placed in the passageway to help overcome any reluctance by a snake as it enters unfamiliar surroundings within the device. When grass or similar unsecured material is used, a barrier may be employed to prevent such material from fouling closure of the passageway door. Such a barrier may have a small hole surrounded by finger-like projections of a plaint material such as sheet rubber, which is capable of giving way under gentle pressure before returning to its original configuration after a snake has passed therethrough.

The device may be made of any suitable material such as plastic, wood, metal, including welded or mashed wire, or any combination of these, and should be chemically inert. Where such material providing the wall and floor surfaces of the passageway in essentially smooth then sufficient additional irregularities may be required within the passageway to aid a snake's movement.

To assist with understanding the invention, reference will now be made to the accompanying drawings which show one example of the invention.

Referring to FIG. 1 it can be seen that the snake trapping device according to this invention is a shallow box 1 with an internal passageway 2 which is formed by sections of partitioning 3 which follow the inside of the walls of the box 1 in a parallel manner, through a series of 90° bonds. The entrance to this passageway 2 is fitted with a trigger activated door 4 which pivots horizontally 5 and is held in the open position by the door release component 6 of the trigger assembly 7. The two wire arms 8 and 9 of the trigger assembly 7 are free to slide through two holes 10 and 11 in the trigger mounting block 12. The lower wire arm 8 is bent perpendicularly to provide an irregularity, the trigger contact component 13, against which a snake 14 will push as it moves within the device. This push causes both arms 8 and 9 to slide through the holes 10 and 11 in the trigger mounting block 12 until the door release component 6 releases the door 4 which closes against the floor of the passageway, to trap the snake 14.

The passageway 2 in loosely filled with long strands of dried grass 15 which is prevented from fouling the closure of the door 4 by a barrier 16 which has a small hole 17, surrounded by finger-like projections 27 of a plaint material such as rubber sheet.

The transparent lid 18 slides into position and is held from above by inward projection lips 19, 20 and 21 on the top three walls of the box 1.

Small legs 22 under each corner of the box 1 elevate the device and perforations 23 in the floor of the box 1 aid ventilation.

Additional irregularities 24 may be provided to assist a snake's movement should the wall and floor surfaces of the passageway 2 be smooth.

It will be realised that the snake trapping device according to this invention is not restricted to the shape or design of the box or any of its features as shown in the example, but need only be provide some form of enclosed passageway with a door which is trigger activated, the contact component of this trigger being formed and positioned to provide an irregularity against which a snake will push in order to aid its movement within the device.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

I claim:
1. A snake trapping device including:

a trigger activated door;

a trigger for activating closure of the door, said trigger being located remotely from the trigger activated door; and a conduit having and being bordered by partitioning, said trigger activated door being mounted in said conduit, said conduit extending along a passageway to spiral from the trigger activated door back to a return location contiguous to that portion of the passageway containing the trigger activated door, the trigger being mounted to reciprocate across the partitioning at said return location;

wherein the trigger is moveable transversely to said passageway in a substantially horizontal direction to release the trigger activated door and is located at a height such that it is activated by the snake applying a substantially horizontal force to the trigger, the substantially horizontal force being generated by the snake pushing off the trigger to propel ltself within the device.

* * * * *